United States Patent
Olgaard et al.

(10) Patent No.: US 10,298,340 B2
(45) Date of Patent: May 21, 2019

(54) METHOD FOR IMPROVED ACCURACY OF LOW POWER RADIO FREQUENCY (RF) SIGNAL MEASUREMENTS WHEN USING RECEIVED SIGNAL STRENGTH INDICATOR (RSSI) FUNCTIONS

(71) Applicants: LitePoint Corporation, Sunnyvale, CA (US); Christian Volf Olgaard, Saratoga, CA (US); Ruizu Wang, San Ramon, CA (US); Qing Jie Lu, Shanghai (CN)

(72) Inventors: Christian Volf Olgaard, Saratoga, CA (US); Ruizu Wang, San Ramon, CA (US); Qing Jie Lu, Shanghai (CN)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 15/535,135

(22) PCT Filed: Dec. 22, 2016

(86) PCT No.: PCT/CN2016/111538
§ 371 (c)(1),
(2) Date: Jun. 12, 2017

(87) PCT Pub. No.: WO2018/112844
PCT Pub. Date: Jun. 28, 2018

(65) Prior Publication Data
US 2018/0351664 A1    Dec. 6, 2018

(51) Int. Cl.
*H04B 17/318* (2015.01)
*H04B 17/21* (2015.01)

(52) U.S. Cl.
CPC ......... *H04B 17/318* (2015.01); *H04B 17/21* (2015.01)

(58) Field of Classification Search
None
See application file for complete search history.

(56) References Cited

U.S. PATENT DOCUMENTS

| | | | | |
|---|---|---|---|---|
| 6,148,194 A | * | 11/2000 | Kao | H04B 17/0085 455/421 |
| 2008/0116878 A1 | * | 5/2008 | Nicholson | G01R 21/12 324/95 |

(Continued)

FOREIGN PATENT DOCUMENTS

| CN | 101459955 A | 6/2009 |
|---|---|---|
| CN | 101834677 A | 9/2010 |

OTHER PUBLICATIONS

International Search Report, PCT/CN2016/111538, dated Sep. 29, 2017, 3 pages.

(Continued)

*Primary Examiner* — David Bilodeau
(74) *Attorney, Agent, or Firm* — Fountainhead Law Group P.C.

(57) ABSTRACT

A method for improving accuracy of power measurements of low power radio frequency (RF) signals received by a RF signal receiver in which power measurement accuracy taken at a low resolution is compensated with use of multiple RF signal attenuations at a finer resolution. In accordance with exemplary embodiments, incremental RF signal attenuations are applied to the received RF signal. An average of the power measurements, including those with the applied signal attenuations, has a net measurement error less than that of a direct power measurement.

12 Claims, 4 Drawing Sheets

(56) References Cited

U.S. PATENT DOCUMENTS

| | | | | |
|---|---|---|---|---|
| 2010/0007355 A1* | 1/2010 | Olgaard | .............. | H04B 17/327 |
| | | | | 324/601 |
| 2011/0086603 A1 | 4/2011 | Toosi et al. | | |
| 2011/0149773 A1* | 6/2011 | Lee | ................. | H03G 3/3078 |
| | | | | 370/252 |
| 2011/0217937 A1* | 9/2011 | Cook | ................ | H04B 17/0085 |
| | | | | 455/67.14 |
| 2015/0054687 A1* | 2/2015 | Reed | ................ | H04B 17/0085 |
| | | | | 342/361 |

OTHER PUBLICATIONS

Written Opinion, PCT/CN2016/111538, dated Sep. 29, 2017, 3 pages.

\* cited by examiner

| input (dBm) | Instrument attenuation (dB) | Actual RSSI (dBm) | DUT reported RSSI (dBm) | Reported RSSI (dBm) | Error | | input (dBm) | Instrument attenuation | Actual RSSI | DUT reported RSSI | Reported RSSI | | Averaged RSSI | Error | |
|---|---|---|---|---|---|---|---|---|---|---|---|---|---|---|---|
| -50.1 | 6 | -56.1 | -56 | -50 | 0.1 | | -50.1 | 6 | -56.1 | -56 | -50 | | -50.125 | -0.025 | |
| -50.1 | 6 | -56.1 | -56 | -50 | | | -50.1 | 6.25 | -56.35 | -56 | -49.75 | | | | |
| -50.1 | 6 | -56.1 | -56 | -50 | | | -50.1 | 6.5 | -56.6 | -56 | -49.5 | | | | |
| -50.1 | 6 | -56.1 | -56 | -50 | | | -50.1 | 6.75 | -56.85 | -56 | -49.25 | | | | |
| -50.1 | 6 | -56.1 | -56 | -50 | | | -50.1 | 7 | -57.1 | -58 | -51 | | | | |
| -50.1 | 6 | -56.1 | -56 | -50 | | | -50.1 | 7.25 | -57.35 | -58 | -50.75 | | | | |
| -50.1 | 6 | -56.1 | -56 | -50 | | | -50.1 | 7.5 | -57.6 | -58 | -50.5 | | | | |
| -50.1 | 6 | -56.1 | -56 | -50 | | | -50.1 | 7.75 | -57.85 | -58 | -50.25 | | | | |
| | | | 0 | | | | | | | 0 | | | | | |
| -50.25 | 6 | -56.25 | -56 | -50 | 0.25 | | -50.25 | 6 | -56.25 | -56 | -50 | | -50.375 | -0.125 | MAX |
| -50.25 | 6 | -56.25 | -56 | -50 | | | -50.25 | 6.25 | -56.5 | -56 | -49.75 | | | | |
| -50.25 | 6 | -56.25 | -56 | -50 | | | -50.25 | 6.5 | -56.75 | -56 | -49.5 | | | | |
| -50.25 | 6 | -56.25 | -56 | -50 | | | -50.25 | 6.75 | -57 | -58 | -51.25 | | | | |
| -50.25 | 6 | -56.25 | -56 | -50 | | | -50.25 | 7 | -57.25 | -58 | -51 | | | | |
| -50.25 | 6 | -56.25 | -56 | -50 | | | -50.25 | 7.25 | -57.5 | -58 | -50.75 | | | | |
| -50.25 | 6 | -56.25 | -56 | -50 | | | -50.25 | 7.5 | -57.75 | -58 | -50.5 | | | | |
| -50.25 | 6 | -56.25 | -56 | -50 | | | -50.25 | 7.75 | -58 | -58 | -50.25 | | | | |
| | | | 0 | | | | | | | 0 | | | | | |
| -50.3 | 6 | -56.3 | -56 | -50 | 0.3 | | -50.3 | 6 | -56.3 | -56 | -50 | | -50.375 | -0.075 | |
| -50.3 | 6 | -56.3 | -56 | -50 | | | -50.3 | 6.25 | -56.55 | -56 | -49.75 | | | | |
| -50.3 | 6 | -56.3 | -56 | -50 | | | -50.3 | 6.5 | -56.8 | -56 | -49.5 | | | | |
| -50.3 | 6 | -56.3 | -56 | -50 | | | -50.3 | 6.75 | -57.05 | -58 | -51.25 | | | | |
| -50.3 | 6 | -56.3 | -56 | -50 | | | -50.3 | 7 | -57.3 | -58 | -51 | | | | |
| -50.3 | 6 | -56.3 | -56 | -50 | | | -50.3 | 7.25 | -57.55 | -58 | -50.75 | | | | |
| -50.3 | 6 | -56.3 | -56 | -50 | | | -50.3 | 7.5 | -57.8 | -58 | -50.5 | | | | |
| -50.3 | 6 | -56.3 | -56 | -50 | | | -50.3 | 7.75 | -58.05 | -58 | -50.25 | | | | |
| | | | 0 | | | | | | | 0 | | | | | |
| -50.9 | 6 | -56.9 | -56 | -50 | 0.9 | | -50.9 | 6 | -56.9 | -56 | -50 | | -50.875 | 0.025 | |
| -50.9 | 6 | -56.9 | -56 | -50 | | | -50.9 | 6.25 | -57.15 | -58 | -51.75 | | | | |
| -50.9 | 6 | -56.9 | -56 | -50 | | | -50.9 | 6.5 | -57.4 | -58 | -51.5 | | | | |
| -50.9 | 6 | -56.9 | -56 | -50 | | | -50.9 | 6.75 | -57.65 | -58 | -51.25 | | | | |
| -50.9 | 6 | -56.9 | -56 | -50 | | | -50.9 | 7 | -57.9 | -58 | -51 | | | | |
| -50.9 | 6 | -56.9 | -56 | -50 | | | -50.9 | 7.25 | -58.15 | -58 | -50.75 | | | | |
| -50.9 | 6 | -56.9 | -56 | -50 | | | -50.9 | 7.5 | -58.4 | -58 | -50.5 | | | | |
| | | | | | | | | | | | | | | | |
| -51 | 6 | -57 | -58 | -52 | -1 | MAX | -51 | 6 | -57 | -57 | -51 | | -51.125 | -0.125 | |
| -51 | 6 | -57 | -58 | -52 | | | -51 | 6.25 | -57.25 | -57 | -50.75 | | | | |
| -51 | 6 | -57 | -58 | -52 | | | -51 | 6.5 | -57.5 | -58 | -51.5 | | | | |
| -51 | 6 | -57 | -58 | -52 | | | -51 | 6.75 | -57.75 | -58 | -51.25 | | | | |
| -51 | 6 | -57 | -58 | -52 | | | -51 | 7 | -58 | -58 | -51 | | | | |
| -51 | 6 | -57 | -58 | -52 | | | -51 | 7.25 | -58.25 | -58 | -50.75 | | | | |
| -51 | 6 | -57 | -58 | -52 | | | -51 | 7.5 | -58.5 | -59 | -51.5 | | | | |
| -51 | 6 | -57 | -58 | -52 | | | -51 | 7.75 | -58.75 | -59 | -51.25 | | | | |

Fig. 4

METHOD FOR IMPROVED ACCURACY OF LOW POWER RADIO FREQUENCY (RF) SIGNAL MEASUREMENTS WHEN USING RECEIVED SIGNAL STRENGTH INDICATOR (RSSI) FUNCTIONS

The application is a U.S. National Phase Entry of International Application No. PCT/CN2016/111538 filed on Dec. 22, 2016, designating the United States of America. The present application claims priority to and the benefit of the above-identified application and the above-identified application is incorporated by reference herein in their entirety.

BACKGROUND

The present invention relates to testing of radio frequency (RF) signal receivers, and in particular, to measuring input signal power sensitivities of RF signal receivers under low input signal power conditions using received signal strength indicator (RSSI) functions.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

During manufacturing testing, it is common to test a partially assembled device using conductive signal connections and conveyance (e.g., co-axial RF cables and connectors) and test systems designed for such hardware. However, final testing of fully assembled devices designed for wireless operations typically requires over-the-air (OTA) signal paths and conveyance which present very different signal levels as compared to wired systems. For example, wireless signal levels are typically much lower than those conveyed conductively. This may require signal boosting adjuncts in the test system front end. In addition, test systems which ordinarily process signal levels that are considerably higher may have inherent noise levels that are small compared to conducted signals but proportionally higher when compared to wireless signals and, therefore, more likely to be disruptive when testing OTA signals.

Wireless devices themselves are designed to receive small signals and often have received signal strength indication (RSSI) subsystems that can work with the low-level signals encountered during OTA operations. However, most such RSSI subsystems have lower, often significantly lower, resolution than subsystems used to measure power of conducted signals. Thus, although RSSI functionality may be employed to measure power of OTA signals, the resolution may not be sufficient to instill confidence in results when using OTA test techniques.

Accordingly, it would be advantageous to enable use of existing RSSI subsystems while somehow overcoming their low signal level constraints and provide sufficient resolution to make more accurate power-level measurements, thereby enabling testing low-level signal power at lower test device cost without compromising testing integrity.

SUMMARY

A method for improving accuracy of power measurements of low power radio frequency (RF) signals received by a RF signal receiver in which power measurement accuracy taken at a low resolution is compensated with use of multiple RF signal attenuations at a finer resolution. In accordance with exemplary embodiments, incremental RF signal attenuations are applied to the received RF signal. An average of the power measurements, including those with the applied signal attenuations, has a net measurement error less than that of a direct power measurement.

A method for improving accuracy of power measurements of low power radio frequency (RF) signals received by a RF signal receiver, including:

measuring an initial RF signal power of a received RF signal to determine a measured initial power, followed by attenuating the received RF signal one or more times to produce one or more attenuated RF signal powers, and measuring each of the one or more attenuated RF signal powers to determine one or more measured attenuated powers, thereby producing a plurality of measured powers including the measured initial and attenuated powers; and determining an average of the measured initial and attenuated powers.

A method for improving accuracy of power measurements of low power radio frequency (RF) signals received by a RF signal receiver, including:

measuring, a plurality of times, a RF signal power of a received RF signal to determine a plurality of N measured powers;

between prior and subsequent instances of the measuring, attenuating the received RF signal to produce a plurality of N 1 attenuated RF signal powers; and determining an average of the plurality of N measured powers.

BRIEF DESCRIPTION OF THE DRAWINGS

FIG. 4 depicts exemplary power measurement results when measuring low power RF signals in accordance with an exemplary embodiment of the presently claimed invention.

DETAILED DESCRIPTION

Figure 1:
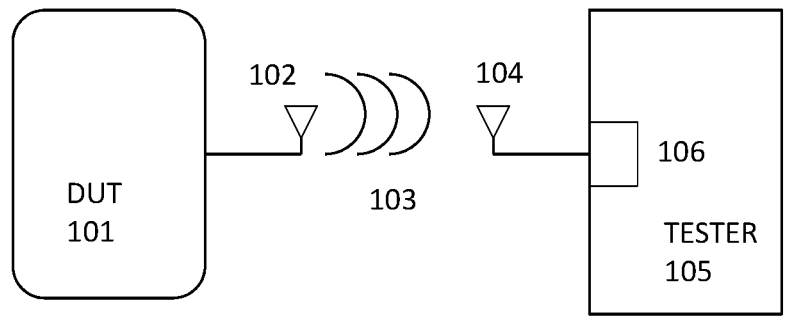
FIG. 1 depicts a conventional over the air (OTA) test environment for testing a wireless RF signal receiver.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Wireless devices, such as cellphones, smartphones, tablets, etc., make use of standards-based technologies, such as IEEE 802.11a/b/g/n/ac ("Wi-Fi"), 3GPP LTE, and Bluetooth. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

As noted above, it is common to test wireless devices in various states of partial assembly using conductive signals, where signal strengths will often be orders of magnitude higher than those that would be conveyed using OTA signals. Thus, a typical signal analysis subsystem (e.g., a VSA), designed to measure conducted signals, could provide accurate signal power results. However, that same subsystem would be hard pressed to detect and measure OTA-level signals without some signal amplification upstream of its input. Also, the inherent noise levels of the signal analysis subsystem may be relatively low compared to the higher conducted signal power levels but may be significantly higher relative to, and therefore disruptive to, OTA signal power levels.

Referring to FIG. 1, in a conventional over the air (OTA) test environment for testing a wireless RF signal receiver device under test (DUT) 101, its OTA signals are transmitted from its antenna 102 for OTA propagation 103 to the antenna 104 of the test system 105 for delivery to and analysis by a power measurement subsystem 106 contained within or otherwise associated with the tester 105. As noted previously, the OTA signal level may be near or below the sensitivity of the power measurement subsystem 106.

Figure 2:
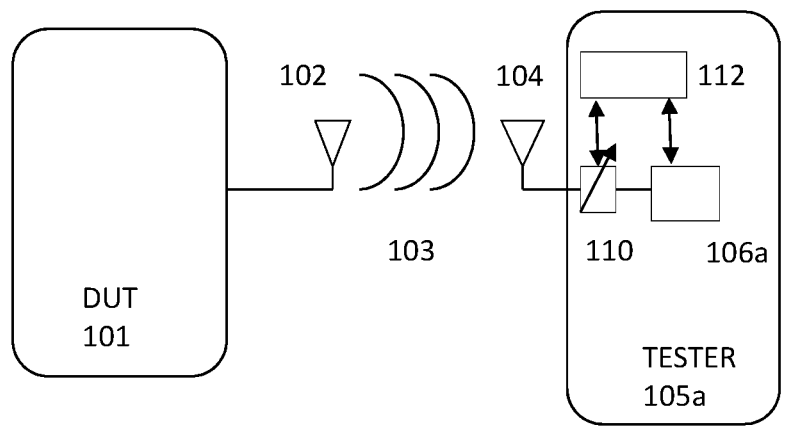
FIG. 2 depicts an OTA test environment for testing a wireless RF signal receiver in accordance with exemplary embodiments of the presently claimed invention.

Referring to FIG. 2, in an OTA test environment for testing a wireless RF signal receiver DUT in accordance with exemplary embodiments of the presently claimed invention, the same DUT transmits an OTA signal from its antenna 102 for OTA propagation 103 to the antenna 104 of the test system 105a for delivery to and analysis by to a power measurement subsystem 106a that includes a wireless device-type RSSI subsystem. Using a wireless device subsystem in this way to measure signals for conformance with a given signal standard can be advantageous over a dedicated commercial test instrument. For example, the wireless device subsystem already has hardware necessary to detect the desired data packets and offers the desired specific filtering of out-of-band noise so as to ensure measurement of the desired signal with only in-band noise.

Generally, RSSI subsystems are designed to indicate a 2 dB (decibel) difference in received signal level strength. In the context of a typical wireless signal standard compliance specification, such resolution is too coarse, or low, for most purposes. Also, the absolute measurement accuracy may not be sufficient. However, it is possible to improve the absolute accuracy with the right calibration techniques to remove, or at least significantly reduce, the error. While the resolution itself may be coarse (e.g., 2 dB), accuracy of the detection and repeatability thereof is usually much higher, as the received signal is often digitized to much higher resolution to facilitate and improve downstream decoding of the signal data. The RSSI indication is usually rounded as there is often no need for higher accuracy from a system perspective.

Referring again to FIG. 2, in accordance with exemplary embodiments of the presently claimed invention, the RSSI subsystem 106a is preceded by a fine-step signal attenuation subsystem 110. This fine-step attenuator 110 enables controllable attenuation of the received signal level by a known amount per step, e.g., 0.25 dB. As discussed in more detail below, by varying, or dithering, the strength of the signal being received at the input of the RSSI subsystem 106a using the attenuation subsystem 110, the effective accuracy of the RSSI measurement can be improved. Toward that end, a control subsystem 112 changes the attenuation steps, stores and accumulates the RSSI readings performed by the RSSI subsystem 106a, and performs an averaging over multiple attenuation steps to produce an effective power measurement having higher resolution than an RSSI subsystem on its own.

Figure 3:
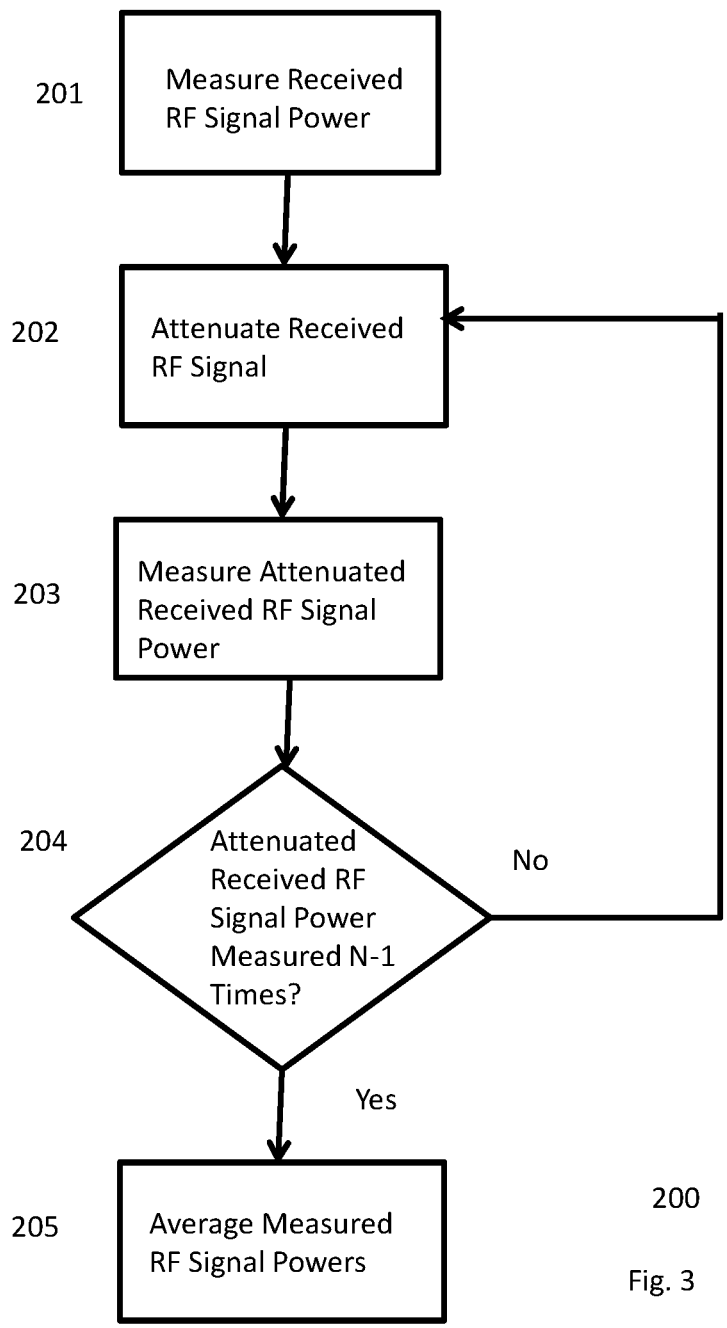
FIG. 3 depicts a method for improving accuracy of power measurements of low power RF signals in accordance with an exemplary embodiment of the presently claimed invention.

Referring to FIG. 3, a method 200 of using multiple dithered RSSI measurements to increase measurement accuracy in accordance with exemplary embodiments of the presently claimed invention can be implemented using steps as shown. For example, the process begins by measuring the received RF signal power 201 (e.g., with little or zero attenuation initially introduced by the attenuator 110 and stored by the controller 112), after which an initial attenuation is introduced 202 by the attenuator 110, following which the received RF signal power is again measured 203 and stored by the controller 112. If it is determined that these measurements have been performed fewer than a predetermined number N-1 of times 204, the attenuation 202 and measurement 203 steps are repeated; otherwise the power measurements are averaged 205 (e.g., by the controller 112).

Referring to FIG. 4, this technique can perhaps be better understood using an example set of power measurement and attenuation steps. The left side of the table shows the RSSI results for a signal whose power is diminished from −50.1 dBm to −51.0 dBm. With a fixed 6 dB attenuation in the instrument, the actual RSSI would decrease from −56.1 dBm to −57 dBm, and the reported RSSI (after taking account of the 6 dB attenuation) would remain fixed at −50 dBm for signal levels from −50.1 dBm to −50.9 dBm, and would then jump to −52 dBm for the −51 dBm signal measurement. The right side table shows the effect of dithering the instrument attenuation from 6 dB to 7.75 dB (e.g., eight steps of 0.25 dB each). The actual RSSI would change from −56.1 dBm to −57.85 dBm and the DUT reported RSSI would change from −56 dBm to −58 dBm, as shown. The reported RSSI, when accumulated and averaged would be −50.125 dBm for the signal of strength −50.1 dBm. This is an error of 0.025 dB whereas without dithering the error would be 0.1 dB. Thus, dithering provided lower error and increased resolution. For a signal of −50.25 dBm, the non-dithered error would be 0.25 dB versus 0.125 dB for the dithered measurement. At −50.3 dBm, the non-dithered error is 0.3 dB versus 0.075 dB for the dithered results. At −50.9 dBm signal power, the non-dithered measurement yields an error of 0.9 dB versus 0.025 dB resulting from the dithered measurements. This sequence would simply repeat itself as the signal decreased from −51.1 dBm to −51.9 dBm. The maximum error becomes half of the largest step size (0.125 dB for this example), which provides substantially increased accuracy from a test instrument perspective.

While an RSSI subsystem in conjunction with a fine-step attenuator may produce some step errors caused by non-uniform or otherwise imperfect step sizes of the attenuator, simple detection and calibration techniques can be applied to avoid attenuator steps having such errors and thereby improve overall accuracy. One way would be to simply use a different range of the attenuator. If the step error occurs at minimum attenuation, it may lower the input range of the solution, although less accuracy at the lowest input levels (smallest attenuations) may be acceptable for many applications. Otherwise, the input level to the wireless device or RSSI subsystem can be shifted to a desired range. This further reduces the range needed to be calibrated for RSSI accuracy.

Figure 5:
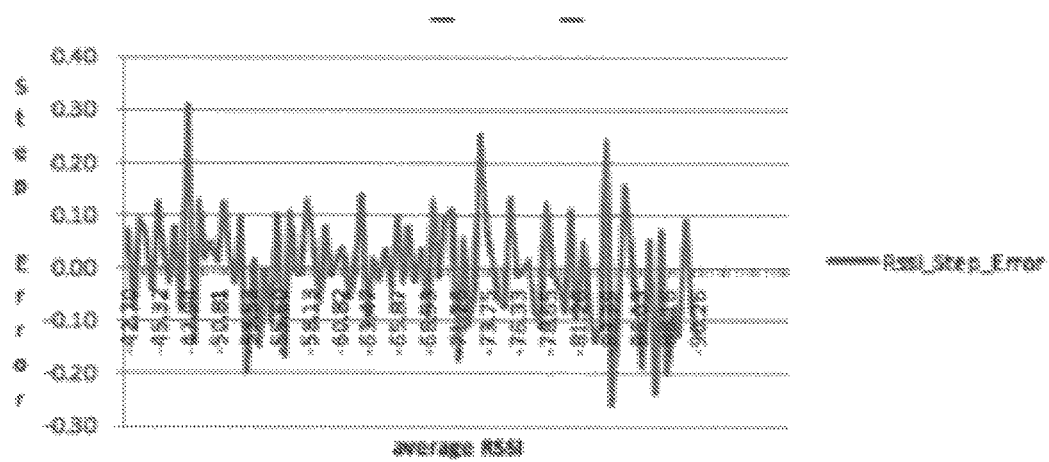
FIG. 5 depicts exemplary RSSI step errors when using a RSSI subsystem to measure signal powers in a range of −42.2 dBm to −90.3 dBm.

Referring to FIG. 5, based upon this example, the RSSI subsystem can cover a power range of −42.2 dBm to −90.3 dBm with worst-case errors of 10.3 dBl which is equivalent to best in class measurement instruments.

Based upon the foregoing, it can be seen that using an RSSI subsystem in conjunction with an upstream fine-step attenuation subsystem can offer significant resolution improvement over typical RSSI measurements. Further, RSSI power level detection can be made reliable down to −90 dBm. And, this can be achieved with a much lower cost of implementation when compared to traditional test instrument solutions.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for improving accuracy of power measurements of low power radio frequency (RF) signals received by a RF signal receiver, comprising:
    measuring an initial RF signal power of a received RF signal to determine a measured initial power, followed by
        attenuating said received RF signal one or more times to produce one or more attenuated RF signal powers, and
        measuring each of said one or more attenuated RF signal powers to determine one or more measured attenuated powers,
        thereby producing a plurality of measured powers including said measured initial and attenuated powers; and
    determining an average of said measured initial and attenuated powers.

2. The method of claim 1, wherein:
    said measuring of said initial RF signal power and said attenuated RF signal power comprises measuring with a power measurement resolution; and
    said attenuating said received RF signal comprises attenuating said received RF signal with a power attenuation resolution greater than said power measurement resolution.

3. The method of claim 1, wherein:
    said measuring of said initial RF signal power and said attenuated RF signal power comprises measuring with a power measurement step size; and
    said attenuating said received RF signal comprises attenuating said received RF signal with a power attenuation step size smaller than said power measurement step size.

4. The method of claim 1, wherein said determining an average of said measured initial and attenuated powers comprises computing an average of said measured initial and attenuated powers.

5. The method of claim 1, wherein said determining an average of said measured initial and attenuated powers comprises dividing a sum of said measured initial and attenuated powers by the number of said measured initial and attenuated powers.

6. The method of claim 1, wherein:
subsequent ones of said attenuating said received RF signal one or more times to produce one or more attenuated RF signal powers comprise further attenuating said received RF signal to produce a further attenuated RF signal power; and
subsequent ones of said measuring each of said one or more attenuated RF signal powers to determine one or more measured attenuated powers comprise measuring said further attenuated RF signal power to determine a measured further attenuated power.

7. A method for improving accuracy of power measurements of low power radio frequency (RF) signals received by a RF signal receiver, comprising: measuring, a plurality of times, a RF signal power of a received RF signal to determine a plurality of N measured powers; between prior and subsequent instances of said measuring, attenuating said received RF signal to produce a plurality of N−1 attenuated RF signal powers; and determining an average of said plurality of N measured powers and N−1 attenuated RF signal powers.

8. The method of claim 7, wherein:
said measuring of said RF signal power comprises measuring with a power measurement resolution; and
said attenuating said received RF signal comprises attenuating said received RF signal with a power attenuation resolution greater than said power measurement resolution.

9. The method of claim 7, wherein:
said measuring of said RF signal power comprises measuring with a power measurement step size; and
said attenuating said received RF signal comprises attenuating said received RF signal with a power attenuation step size smaller than said power measurement step size.

10. The method of claim 7, wherein said determining an average of said plurality of N measured powers and N−1 attenuated RF signal powers comprises computing an average of said plurality of N measured powers and N−1 attenuated RF signal powers.

11. The method of claim 7, wherein said determining an average of said plurality of N measured powers and N−1 attenuated RF signal powers comprises dividing a sum of said plurality of N measured powers and N−1 attenuated RF signal powers by the number of N measured powers and N−1 attenuated RF signal powers.

12. The method of claim 7, wherein:
subsequent ones of said attenuating said received RF signal comprise further attenuating said received RF signal to produce a further attenuated RF signal power; and
subsequent ones of said measuring comprise measuring said further attenuated RF signal power to determine a measured further attenuated power.

\* \* \* \* \*